Aug. 28, 1962   D. B. LAKE   3,050,997
FLOWMETERS
Filed June 3, 1959   3 Sheets-Sheet 1
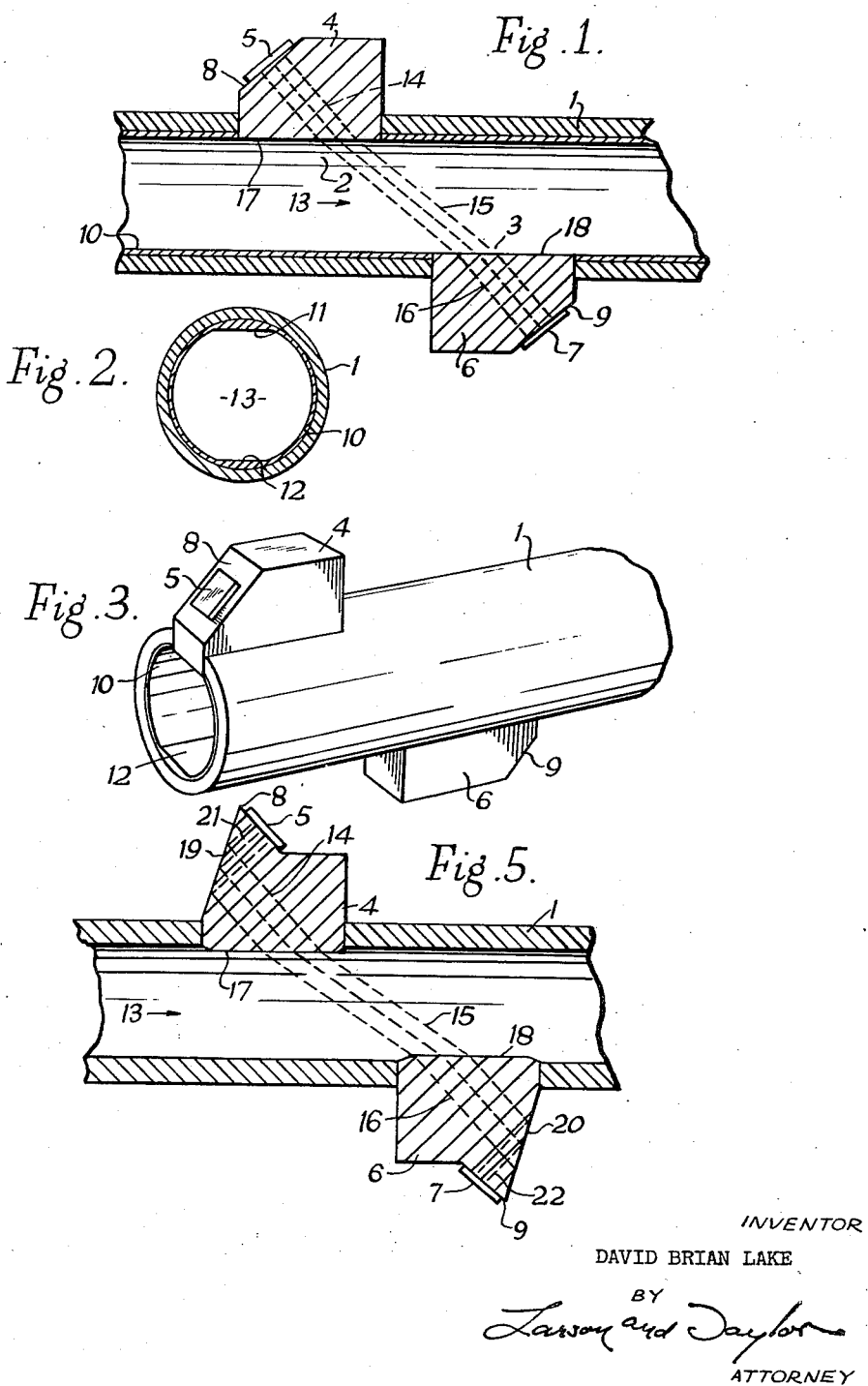
INVENTOR
DAVID BRIAN LAKE
BY
Larson and Taylor
ATTORNEY

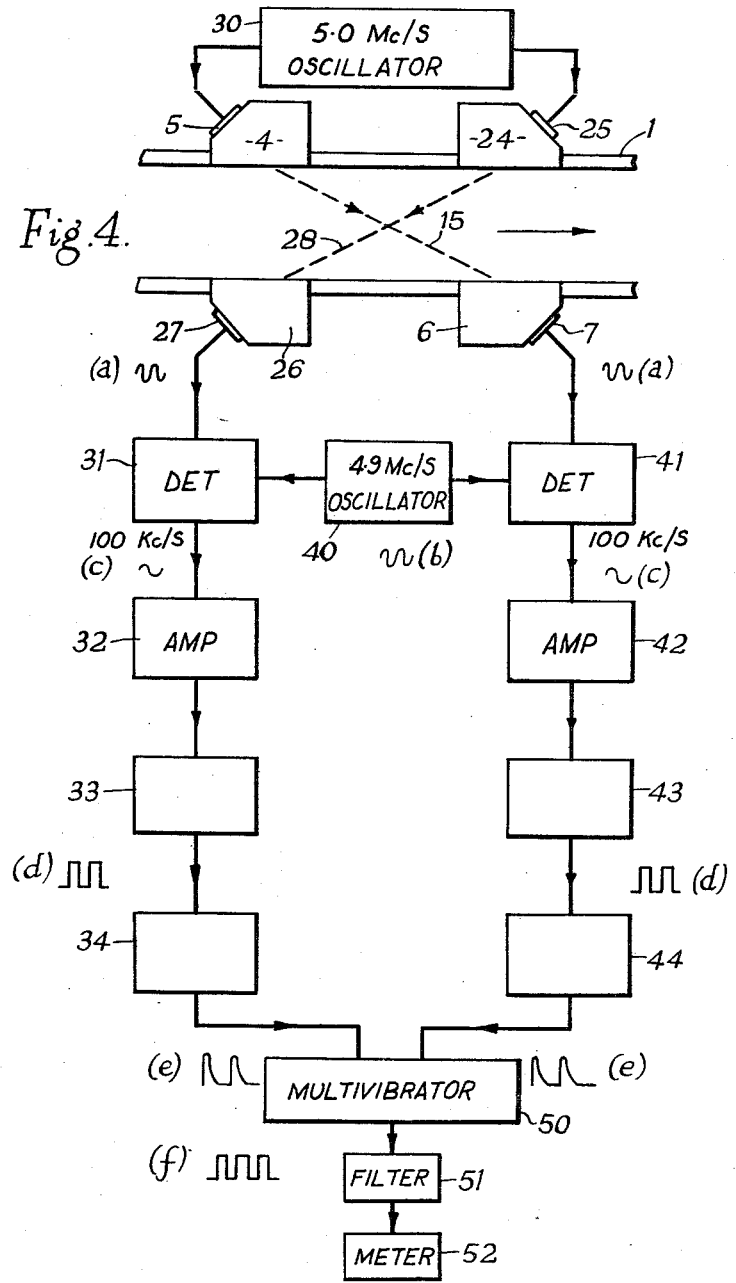

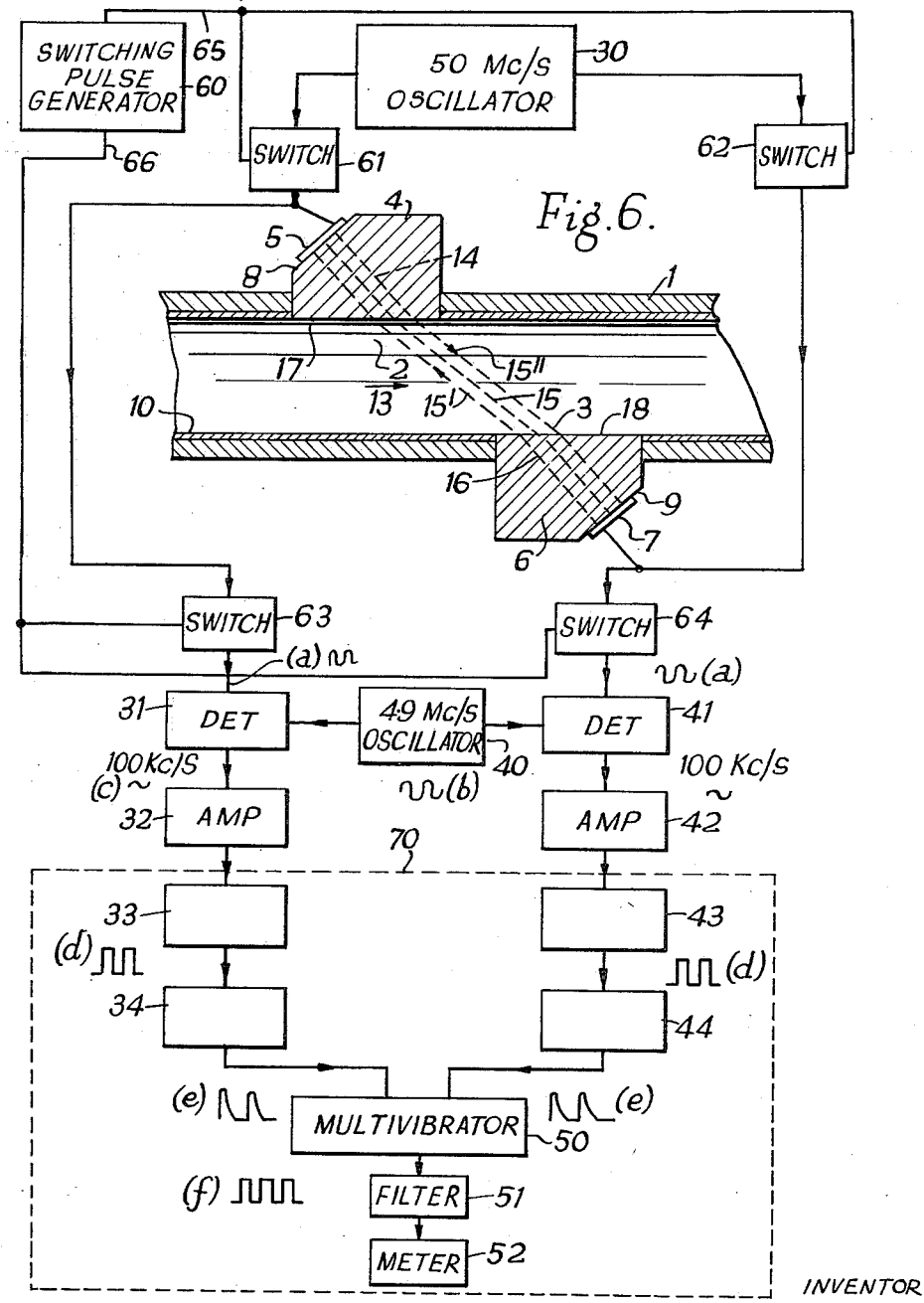

United States Patent Office 3,050,997
Patented Aug. 28, 1962

3,050,997
FLOWMETERS
David Brian Lake, Herne Hill, London, England, assignor to National Research Development Corporation, London, England
Filed June 3, 1959, Ser. No. 817,863
Claims priority, application Great Britain June 10, 1958
11 Claims. (Cl. 73—194)

This invention relates to flowmeters for measuring the velocity of flow of a fluid medium, such as a liquid or slurry, in a pipe by the transmission of ultrasonic waves through the liquid. The usual principle of such flowmeters involves the transmission of ultrasonic waves through the fluid medium in two directions, one up-stream and the other down-stream of the direction of flow and comparing the transit time, normally over paths of equal length. The speed of propagation of the waves in the fluid medium is the same over both paths and the transit time is varied according to the velocity of flow of the fluid medium which shortens the transit time over the down-stream path and lengthens the transit time over the up-stream path. From the difference between the up-stream and down-stream transit times, the velocity of flow of the liquid medium can be calculated, knowing the path lengths, the undisturbed ultrasonic wave propagation velocity and the fluid velocity distribution across the pipe.

In a practical apparatus, the ultrasonic waves are generated by transmitting transducers to which electric current waves of ultrasonic frequency are supplied and the ultrasonic waves are reconverted into electric waves by receiving transducers.

The transmission of the ultrasonic waves in the axial direction of the pipe directly up-stream and down-stream of the fluid flow necessarily involves placing obstructions in the pipe to house the transducers. Accordingly, it has been found more convenient to transmit the waves obliquely across the pipe along paths which pass through the pipe axis, at a small angle thereto, between transmitting and receiving transducers mounted in the pipe walls.

In order to provide a transmission path at a sufficiently small angle to the pipe axis for the transit time to be significantly affected by the fluid flow, transducers have previously been mounted in cavities in the pipe walls. This arrangement is objectionable, because such cavities may give rise to unwanted disturbance of the flow velocity distribution in the pipe and, if the pipe carries a slurry, the slurry may tend to sediment in the cavities and destroy the properties of the flowmeter system.

The present invention provides an improved form of flowmeter in which a coupling block between a transmitting or receiving transducer and the fluid medium in a pipe has an inner face which is substantially flush with this inner wall. By the expression "substantially flush" it is to be understood that sometimes, with a pipe not having plane walls, it is advantageous to arrange for the inner wall of the coupling block to deviate slightly from the inner surface of the pipe, so that the surface of the coupling block is plane. This may simply be obtained, for example, by providing narrow longitudinal flats on the coupling blocks at the fluid-coupling block interface. Such flats may be rounded off at the ends of the coupling block and may then stand a little proud of the internal wall of the pipe. In a case where a liner is fitted in the pipe, for example a plastic liner to avoid corrosion, the flat may be continued longitudinally for the whole length of the liner, in which case the coupling block conforms exactly with the inner wall of the pipe.

According to the present invention, an ultrasonic flowmeter for measuring the rate of flow in a pipe of a fluid medium such as a liquid or slurry comprises at least one pair of transmitting and receiving transducers together with associated coupling blocks for transmitting ultrasonic waves by two paths extending across the pipe, one directed up-stream of the fluid flow and the other directed down-stream of the fluid flow, in which ultrasonic longitudinal or compressional waves are generated in the fluid medium by transverse or shear waves generated in the transmitting coupling block.

Because the velocity of propagation of a transverse wave in the solid material of the coupling block is less than the velocity of propagation of a longitudinal wave in the same material, it is possible to generate ultrasonic waves in the fluid at a greater angle to the normal at the interface, that is to say at a more acute angle to the pipe axis.

The shear wave may be generated in the coupling block directly, for example, by the use of a Y-cut quartz crystal. Alternatively, a shear wave may be generated within the coupling block by first generating a compressional wave and by projecting the compressional wave against a reflecting boundary of the coupling block, to convert the compressional wave into a shear wave. The transverse wave is then reconverted into a compressional wave at the interface of the coupling block with the fluid in the pipe. As a further alternative, a wave may be refracted into a block inserted into the pipe wall to give rise to a transverse wave directed onto the block-fluid interface.

When a compressional wave is refracted into such a block from an external auxiliary liquid-filled chamber, it is possible to arrange for the angle of incidence of the compressional wave to be easily adjustable so that given transmitting and receiving transducers can be used for any flowing fluid.

The feature of the present invention referred to above applies to any flowmeter system in which it is required to propagate an ultrasonic signal across a pipe with an appreciable component in the axial direction.

In a system of the latter type, a single pair of transducers and associated coupling blocks may be used, each transducer being used alternatively as transmitter and receiver as the other transducer is used as receiver and transmitter respectively.

In either form of the apparatus, it will be appreciated that the compressional waves in the pipe are propagated in the form of a beam and that the angle of entry of the beam into the pipe is determined by the angle of incidence of the shear waves upon the solid-to-fluid interface, the velocity of propagation of the shear waves in the solid material of the coupling block and the velocity of propagation of longitudinal waves in the fluid medium. In any practical apparatus, the dimensions and arrangement of the faces of the coupling block are determined as required by the nature of the fluid medium concerned and the material of the coupling block. Suitable materials for the coupling block are polystyrene, perspex, tin, silver and high density lead glass, but other solid materials may be used in like manner.

The coupling blocks may be protected by anti-corrosion coatings at the coupling block fluid medium interface. The thickness of such films is limited when the sound velocities for the coating material are too great for any wave to be refracted into a layer of the material in accordance with the well known refraction laws. Ideally the coating thickness of such "high velocity" materials should be very small compared to the wavelength of sound in the material.

For ultrasonic waves with a frequency of 5 mc./s., protective shims of stainless steel up to approximately 5 thousandths of an inch can be used with the denser coupling block materials, that is, with tin, silver, high density lead glass, without markedly reducing the amplitude of the transmitted waves. For lower frequencies, shim thickness can be increased. No restriction on the thickness holds for "low velocity" coating materials such as platinum, gold and plastics, except insofar as true absorption of energy occurs in the coating material.

With any given fluid medium, the velocity of propagation of longitudinal waves therein will vary with the temperature and pressure of the fluid. This change in velocity will also cause a slight variation in the angle of entry of the ultrasonic beam into the pipe at the solid-to-fluid interface. If the angle of entry becomes more acute relatively to the pipe axis, the length of the path between the two solid-fluid interfaces is slightly lengthened and if the angle of entry becomes more obtuse to the pipe axis the length of the path is reduced.

A further feature of one form of the invention provides automatic correction for limited changes in the velocity of propagation of longitudinal waves in the fluid due to the above-mentioned causes or due to actual changes in composition of the fluid. Such correction is obtained by so choosing the angle of incidence of the shear wave upon the interface between the coupling block and the fluid medium that the change of the resultant angle of entry of the compressional wave into the fluid medium caused by the temperature or other variation of the fluid medium substantially compensates for the change in the velocity of propagation of the compressional waves through the fluid medium.

The principle of this feature of the invention can conveniently be demonstrated mathematically. Let $D$ be the internal diameter of a pipe, $c$ the velocity of sound waves in the fluid medium flowing in the pipe, $v$ the mean velocity of flow of the fluid medium in the pipe and $\theta$ the angle the ultrasonic beam makes with the normal at the coupling block-to-fluid medium interface, then the differential transit time $$dt = \frac{kvD \tan \theta}{c^2}$$

where $k$ is a constant depending on the fluid velocity variation across the pipe. Change in temperature etc. of the fluid medium will cause a change in the velocity of propagation of the sound waves $c$. However, a change in $c$ will result in a change in the angle of beam entry $\theta$.

The angle $\theta$ is related to the angle of incidence of the beam at the coupling block-fluid medium interface and the sound velocities in the block and the fluid by the well known refraction law. In accordance with this law $\sin \theta$ is proportional to $c$ so that $$\frac{c^2}{\tan \theta}$$

will be proportional to $$\frac{\sin^2 \theta}{\tan \theta}$$

that is, proportional to $\sin 2\theta$, and $$\frac{d}{dc} \frac{c^2}{\tan \theta}$$

will be proportional to $$\frac{d}{d(\sin \theta)} \sin 2\theta$$

When $$\theta = 45°, \frac{d}{d \sin \theta}$$

is equal to zero, so that if the direction of the incident beam in the coupling block is such that $$\theta = 45°, \frac{d}{dc} \frac{c^2}{\tan \theta}$$

will be zero and errors due to small changes in $c$ will be so small as to be negligible. For example, a variation in $c$ of $\pm 3\%$ results in a flowmeter error in measurement of fluid flow velocity of less than 0.2%.

For any given percentage change in $c$ about a given sound velocity $c_0$, the angle $\theta_0$ appropriate to $c_0$ will be somewhat less than 45° for the smallest maximum flowmeter error but there is no significant difference if $\theta_0$ is arranged to be equal to 45°. For any given range of $c$, the possible error may be halved by calibrating with a value for $$\frac{c^2}{\tan \theta}$$

given by the mean of the minimum value of this quantity in the range and the value $$\frac{c_0^2}{\tan \theta}$$

The above correction principle assumes that changes in temperature or pressure have negligible effect on the angle $\theta$ due to changes of sound velocity in the coupling medium or media.

Coupling block materials with sufficiently low shear wave velocities, velocity-temperature coefficients and attenuation for most applications are high density lead glass, which has a density in the region of 6 gm./cm.³ or greater, and silver.

The automatic sound velocity correction feature of the invention may also be used in systems where the ultrasonic beams traversing the pipe are obtained from a phased array of sources at the pipe-fluid flow interface or from a reflecting echelon or echelette grating at this interface irradiated by an ultrasonic beam transversing the fluid at right angles to the pipe axis. Similar phased arrays or reflecting echelon-transducer arrangements may then be used for receivers.

In order that the invention may be more clearly understood, two embodiments thereof will now be described in detail, by way of example, with reference to the drawings accompanying this specification, of which:

FIG. 1 is a longitudinal section through a pipe carrying a fluid, the velocity of which is to be measured, showing coupling blocks and transducers associated with one transmission path mounted in the pipe walls;

FIG. 2 is a cross-sectional view through the pipe of FIG. 1;

FIG. 3 is a diagrammatic perspective view of the arrangement of FIG. 1;

FIG. 4 shows one arrangement of a complete ultrasonic flowmeter;

FIG. 5 shows a modified form of the apparatus shown in FIG. 1, wherein a compressional wave is first generated in the coupling block and is transformed at an interface into a shear wave; and FIG. 6 shows a complete ultrasonic flowmeter using a single pair of transmitting and receiving transducers.

In FIG. 1, a pipe 1 of circular cross-section has two windows 2, 3 into which are fitted respectively a transmitting coupling block 4, having mounted thereon a transmitting transducer 5, and a receiving coupling block 6, having mounted thereon a receiving transducer 7.

In this example, the transducer 5 is a Y-cut quartz crystal, but other transducers are known and may be used satisfactorily. Similarly, the transducer 7 is a quartz crystal.

In this example, the coupling blocks 4, 6 are both made of polystyrene and are of the same shape. Each is of rectangular cross-section in a plane to which the pipe axis is normal. In a plane through the pipe axis, the plane of FIG. 1, the blocks are of rectangular section modified by an oblique face 8, 9 respectively, on which the transducers 5, 7 respectively are mounted. The coupling blocks 4, 6 are fitted in the windows 2, 3 respectively, with the oblique faces 8, 9 facing towards each other through the coupling blocks.

The undersides of the blocks 4, 6 are flat and do not conform with the cylindrical inner face of the pipe 1. A plastic liner 10 fitted inside the pipe 1 has corresponding flats 11, 12 formed on opposite faces, as shown in FIG. 3, extending the whole length of the liner.

A fluid medium 13, in this case a liquid, flows through the liner 10 along the pipe 1 in the direction of the arrow adjacent the reference numeral 13.

Electric waves of ultrasonic frequency are supplied to the transducer 5 to generate within the coupling block 4 a beam of shear waves represented by the parallel broken lines 14. This beam passes through the block 4 in the direction normal to the oblique face 8 until it strikes the solid-to-liquid interface 17 between the block 4 and the liquid 13. At this interface it is converted, in part, into compressional ultrasonic waves in the liquid 13, which form a beam represented by the broken lines 15. This beam travels obliquely across the pipe 1, in the downstream direction of liquid flow, until it strikes the interface 18 between the liquid 13 and the coupling block 6. At the interface 18, the beam is converted in part into a beam of shear waves in the block 6, represented by the broken lines 16. This beam travels to the oblique face 9, where it gives rise to electric waves between the electrodes of the receiving transducer 7.

A similar combination of transmitting and receiving transducers with associated coupling blocks is provided for the up-stream transmission path.

FIG. 4 shows such an arrangement in which a transmitting transducer 25, transmitting coupling block 24, receiving coupling block 26 and receiving transducer 27 are associated with the up-stream transmission path 28.

The transmitting transducers 5, 25 are both supplied continuously with waves of frequency 5.0 mc./s. from an oscillator 30. With an input at this order of frequency and with a transmitting transducer of normal practical dimensions, a narrow beam of ultrasonic waves, with a very small angle of divergence, is generated and propagated through the system to the corresponding receiving transducer. The electric signal from the receiving transducer 27 is supplied to one input of a detector 31, the other input of which is supplied with a signal of frequency 4.9 mc./s. from an oscillator 40. The output from the detector 31 is fed to an amplifier 32 and thence to a waveform squaring circuit 33, a differentiating circuit 34 and to one input of a bistable multivibrator 50.

The electric signal from the receiving transducer 7 is similarly supplied to one input of a detector 41, the other input of which is supplied from the oscillator 40. The output from the detector 41 is similarly fed to an amplifier 42 and thence to a waveform squaring circuit 43, a differentiating circuit 44 and to the second input of the bistable multivibrator 50.

The output wave from the multivibrator 50 is fed by way of a low-pass smoothing filter 51 to an indicating meter 52.

In operation, the sinusoidal wave of frequency 5 mc./s. from the oscillator 30 fed to the transducers 5, 25 is converted into shear waves in the coupling blocks 4, 24 which pass therethrough and are converted into compressional waves at the solid-to-liquid interfaces of the two coupling blocks, in the manner previously explained. Two ultrasonic beams 15, 28 respectively thus pass transversely across the pipe 1 in the down-stream and up-stream directions respectively. The beams 15, 28 travel to the receiving coupling blocks 6, 26 respectively to be converted therein into shear waves and then into electric waves by the receiving transducers 7, 27 respectively.

The received electric signals are both sinusoidal waves of frequency 5.0 mc./s., as indicated at ($a$) in FIG. 4, but are phase displaced with respect to each other, due to the difference in transit time along the up-stream and the down-stream paths. Each detector 31, 41 is supplied with a local oscillator signal which is of 4.9 mc./s. frequency and of sinusoidal form as shown at ($b$) in the figure. The output signal from each detector 31, 41 is a sinusoidal wave ($c$) of the beat frequency 100 kc./s. These two signals correspondingly phase displaced as the high-frequency signals from the transducers 7, 27 are amplified by the amplifiers 32, 42, formed into square waves, represented at ($d$), by the circuits 33, 43 and differentiated by the circuits 34, 44 into sharp pulses, represented at ($e$), relatively displaced in time in the two channels correspondingly as the phase displacement of the sinusoidal signals.

Both sets of signals are fed to the bistable multivibrator 50 so that the multivibrator is switched to one of its stable states by each of one set of pulse signals and is switched to its other stable state by each of the other set of pulse signals. The output of the multivibrator 50 is a succession of pulses of uniform height, the mark-space ratio of the output waveform varying according to the time displacement of the switching pulses, that is according to the phase displacement of the sinusoidal signals, that is according to the difference in transit times by the up-stream and down-stream paths through the liquid, that is according to the rate of flow of the liquid.

The pulse signal from the multivibrator 50 is smoothed by the filter 51 to provide a D.C. signal to the meter 52, which may then be calibrated in terms of flow velocity for the particular system.

In the modification shown in FIG. 5, similar elements to those of the embodiment of FIG. 1 are indicated by the same reference numerals. However, the coupling blocks 4, 6 are differently shaped, having faces 8, 9 which are directed away from each other and faces 19, 20 which are directed towards each other through the coupling blocks, as shown in the figure. As in the embodiment of FIG. 1, the transmitting and receiving transducers are mounted on the faces 8, 9 respectively, but in this embodiment the transducers are X-cut quartz crystals.

The transmitting transducer 5 is supplied with an electric wave of ultrasonic frequency and generates a compressional wave which travels in a beam, represented by the dotted lines 21, to the face 19. At this solid-to-air interface, the compressional wave is converted into a shear wave which travels in a beam 14, as in the block 4 of FIG. 1. Similarly, the shear wave is converted in part into a compressional wave in the fluid medium 13, which wave passes transversely across the pipe 1 to the receiving coupling block 6 where it is converted in part into a shear wave forming the beam 16. The beam 16 travels to the face 20 and at this solid-to-air interface, it is converted in part to a beam 22 of compressional waves. The beam 22 travels to the face 9, at which it gives rise to electrical signals in the receiving transducer 7 identical with those produced in the system of FIG. 1 and FIG. 4.

An alternative system which is illustrated in FIG. 6 of the drawings wherein parts corresponding to those in FIGS. 1 and 4 are indicated by the same reference numerals, uses only two transducers 5, 7 which are adapted for use either as transmitters or receivers, associated with coupling blocks 4, 6 respectively inserted in the walls of the pipe 1 carrying the fluid medium 13, the velocity of which is to be measured. The coupling blocks 4, 6 are displaced axially along the pipe 1 and are otherwise arranged in relative relationship so that a beam of ultrasonic waves may be transmitted from either coupling block through the fluid medium 13 to the other coupling block. The two transducers 5, 7 are supplied from a 5.0 mc./s. oscillator 30 by way of electronic switches 61, 62 respectively. The two switches 61, 62 are switched on simultaneously from a switching pulse generator 60 by means of an "ON" control pulse at one output line 65 of the generator 60. At this time an "OFF" control pulse appears at the second output line 66 of generator 60 and is supplied to control two further electronic switches 63, 64 to which the transducers 5, 7 are respectively connected. At all times, opposite control pulses appear at the two output lines 65, 66, so that when the control pulse at output line 65 changes to "OFF," the control pulse at output line 66 changes to "ON." Pulses of ultrasonic waves are developed by each of the transducers at the same time and for the same period, so that a pulse 15', 15" is developed in each coupling block 4, 6 at the same instant and starts its journey to the other coupling block 6, 4 respectively at the same instant. After the termination of the transmitted pulse period, both the transducers 5, 7 are effectively switched to become receivers by change-over of the control pulses at output lines 65, 66.

Because one of the pulses 15' is travelling up-stream in the fluid medium and the pulse 15" is travelling downstream, the transit times of the two pulses between the transmitting and receiving transducer concerned is different and the arrival of pulse 15' is slightly delayed relatively to the time of arrival of the pulse 15".

The pulses (a), from the switches 63, 64 are fed to separate detectors 31, 41, together with a signal (b) from a local oscillator 40. Two signals (c) at the beat frequency are derived from the two detectors 31, 41 and are compared by a phase comparator 70. The phase comparator 70 may take any convenient form but, in the example of FIG. 6 it is an arrangement similar to that shown in FIG. 4 comprising, in series with the detector 31 and an amplifier 32, a pulse squaring circuit 33 and a differentiating circuit 34. Similarly, in series with the detector 41 and an amplifier 42, the arrangement includes a pulse squaring circuit 43 and a differentiating circuit 44. The outputs of the differentiating circuits 34, 44 are connected to the two inputs of a multivibrator 50, the one input setting the multivibrator 50 to its one state and the other input to its other state. The output from the multivibrator 50 is fed to a filter 51 and thence to an indicating meter 52.

The phase displacement between the two signals 15', 15" serves as a measure of the difference in transit times and hence as a measure of the flow velocity of the fluid medium 13 in the pipe 1, in the same way as for the arrangement of FIG. 4.

In the system described above, with reference to FIGS. 1 and 6, not all of the incident shear wave is converted into a compressional wave and the resultant shear wave are converted at the reflecting face and interface respectively. The residual waves are internally reflected in the coupling block and may be attenuated, if desired, by known techniques.

What I claim is:

1. In an ultrasonic flowmeter for measuring velocity of a confined fluid stream, a transmitting set comprising an ultrasonic transmitting transducer and a coupling block having a first face disposed to contact the fluid stream, said coupling block also having a second face against which said transducer is mounted, and comprising means, including said transducer, for generating ultrasonic shear waves in said coupling block and for directing said waves to be incident upon said first face at such an angle that compressional waves propagated in the fluid stream from said first face leave said first face at an angle of approximately 45° from normal.

2. A transmitting set as defined in claim 1, in which said coupling block has a third face defining a reflecting boundary, said transducer constituting means for generating said ultrasonic shear waves in said coupling block by first directing ultrasonic compressional waves towards said third face, and said third face constituting means for converting said last-mentioned compressional waves into said shear waves and for directing said shear waves to said first face.

3. An ultrasonic flowmeter for measuring velocity of a confined fluid stream comprising two transmitting sets as defined in claim 1, one of said sets being disposed with the said first face of its coupling block contacting the fluid stream at a point upstream from the other, and two ultrasonic wave receivers, one receiver disposed across the fluid stream and downstream from one of said transmitting sets to receive compressional waves propagated in the fluid stream by said one transmitting set, and the other receiver disposed across the fluid stream and upstream from the other of said transmitting sets to receive compressional waves propagated in the fluid stream by said other transmitting set.

4. The ultrasonic flowmeter of claim 3, wherein the transmitting sets and receivers are disposed along the fluid stream to define two paths for compressional waves traveling across the fluid stream from each transmitting set to its corresponding receiver, the first of said paths crossing the fluid stream in a downstream direction and forming an angle of approximately 45° with a line normal to the face of the coupling block of said one transmitting set, the second of said paths crossing the fluid stream in an upstream direction and forming an angle of approximately 45° with a line formal to the face of the coupling block of said other transmitting set.

5. The ultrasonic flowmeter of claim 4 wherein the said first face of each of said coupling blocks is disposed flush with the walls confining said fluid stream and all of the said first faces are parallel.

6. The ultrasonic flowmeter of claim 5, comprising switching means for alternately operating both said transmitting sets simultaneously as ultrasonic wave transmitters and then simultaneously as ultrasonic wave receivers, the two sets being disposed across the fluid stream, one upstream from the other, so that each set serves alternately to transmit compressional ultrasonic waves into the fluid stream and then to receive compressional ultrasonic waves transmitted from the other set.

7. The ultrasonic flowmeter of claim 6 further comprising means connected by said switching means to both of said sets while the said sets serve as receivers, for comparing the transit times of compressional waves traveling by each of said two paths.

8. The ultrasonic flowmeter of claim 7 wherein said means for comparing transit times comprises two detectors each having one input connected with one of said receivers and a second input supplied from a local oscillator and of a frequency to provide a beat frequency output wave from each detector and a phase comparator for comparing the phases of the two detector output waves.

9. The ultrasonic flowmeter of claim 4, further comprising means connected to each of said receivers for comparing the transit times of compressional waves traveling by each of said two paths.

10. The ultrasonic flowmeter of claim 9, wherein said means for comparing transit times comprises two detectors each having one input connected with one of said receivers and a second input supplied from a local oscillator and of a frequency to provide a beat frequency output wave from each detector and a phase comparator for comparing the phases of the two detector output waves.

11. In an ultrasonic flowmeter for measuring velocity of a confined fluid stream, a transmitting set comprising an ultrasonic transmitting transducer, a coupling block having a first face disposed to contact the fluid stream, said block also having a second face against which said transducer is mounted, and comprising means, including said transducer, for generating ultrasonic shear waves in said coupling block and for directing said waves to be incident upon said first face at such an angle that compressional waves propagated in the fluid medium at said first face leave said face at an angle $a$ satisfying the expression: $\sin a = V_s \sin \theta / V_f$, where $V_s$ is the velocity of sound in the material of the coupling block, $V_f$ is the velocity of sound in the said fluid and $\theta$ is approximately 45°.

References Cited in the file of this patent

UNITED STATES PATENTS

| 2,669,121 | Garman et al. | Feb. 16, 1954 |
| 2,844,961 | Hedrich | July 29, 1958 |

OTHER REFERENCES

The Feasibility of Using Wholly External Ultrasonics To Measure Fluid Flow Within Thick-Walled Metal Pipes, by Del Grosso et al. NRL Report 4967. A publication of the Naval Research Laboratory, Washington, D.C.